Patented June 7, 1949

2,472,227

UNITED STATES PATENT OFFICE 2,472,227

PROCESS OF STABILIZING A CELLULOSE ETHER

Walter D. Paist, Orange, and Frank Berardinelli, Newark, N. J., assignors to Celanese Corporation of America, a corporation of Delaware No Drawing. Application January 8, 1946, Serial No. 639,910

7 Claims. (Cl. 106—197)

This invention relates to a novel process for the treatment of cellulose ethers whereby the heat and color characteristics of thermoplastic compositions made therefrom may be substantially improved.

An object of this invention is the production of highly stable cellulose ethers capable of being molded under elevated temperatures and pressures to yield molded products of good clarity and little or no developed color.

Another object of this invention is the preparation of stabilized ethyl cellulose or other cellulose ether molding compositions containing stabilizing agents, which compositions retain substantially their viscosity, color and other characteristics on being molded at elevated temperatures and pressures.

Other objects of this invention will appear from the following detailed description.

Ethyl cellulose molding compositions are extensively employed commercially for the preparation of a wide variety of molded articles. These molding compositions, however, possess certain characteristics which impair their utility. One major undesirable characteristic of certain ethyl cellulose molding compositions is that they possess a yellowish color prior to molding, while certain other ethyl cellulose molding compositions frequently develop yellowish or yellowish-brown colors when subjected to processing operations involving the use of heat. In addition to the above characteristics, it has been observed that where some color is initially present in the ethyl cellulose composition this color may bleach to a lighter shade or even disappear upon exposure to light containing rays in the ultra-violet portion of the spectrum. This latter type of color instability makes a standardized or controlled application of such ethyl cellulose compositions quite difficult. Accordingly, the matching of a particular shade to a known color standard must take into account not only the initial color of the ethyl cellulose molding composition but also compensate for any developed color and any fading which may occur on exposure of the molded article to ultra-violet light. Furthermore, where the ethylcellulose molding composition tends to develop color on molding, even the slightest deviation from the particular time or temperature employed will appreciably alter the shade. The color stabilization of ethyl cellulose compositions to minimize any changes in shade due to the action of light or heat where the ethyl cellulose tends to develop some color when molded is therefore a considerable problem in the art.

We have now discovered that the color instability of thermoplastic molding compositions having a basis of cellulose ether, such as ethyl cellulose, may be substantially minimized or even entirely eliminated if the ethyl cellulose in particulate form, such as in the form of flakes, is subjected to extraction, prior to molding, with an organic liquid extractant capable of swelling the ethyl cellulose only slightly without dissolving any excessive amounts thereof. Optimum results are obtained in said novel extraction process where the extractant liquid employed comprises an aqueous solution of a lower aliphatic alcohol, such as, for example, methyl alcohol, ethyl alcohol, propyl alcohol or isopropyl alcohol. The unstable color-forming bodies are removed by this step and the color developed in the treated ethyl cellulose in subsequent molding operations is far less than that normally produced.

The aqueous solution of the alcoholic extractant liquid employed as the extracting medium may contain up to about 25 to 75% by weight of water and the extraction carried out, one, two, three or more times, depending upon the initial color instability of the ethyl cellulose, flake size, density, etc. The concentration of the extractant liquid should be sufficiently high to effect a substantial swelling of the ethyl cellulose during the extraction at the temperature employed. The extraction or extractions may be effected at a temperature of 25 to 75° C. Most advantageously, the ethyl cellulose is subjected to from two to four extractions, each of a duration of 10 to 30 minutes, with an extracting medium comprising an aqueous solution containing 40 to 60% by weight of ethyl alcohol. The extractions are preferably carried out at a temperature of 25 to 35° C. The higher the temperature employed for extracting the ethyl cellulose, the more dilute the aqueous alcoholic liquid extractant may be to effect the desired swelling. Where methyl alcohol is employed at room temperature, the extracting solution preferably contains 30 to 70% by weight of methyl alcohol. Where aqueous solutions of, say, isopropyl alcohol are employed as the extractant at room temperature, the solution preferably contains 30 to 50% by weight of isopropyl alcohol. From 5 to 20 parts by weight of said aqueous alcoholic extractant are employed for each extraction on the weight of the ethyl cellulose undergoing extraction.

The color stability of the extracted ethyl cellulose may be even further improved if certain color stabilizing agents are incorporated in said ethyl cellulose composition after the extraction, i. e. prior to molding. Color stabilizing agents such as citric acid, octyl sulfite, decyl sulfite and triethyl citryl sulfite are particularly advantageous. Mixtures of two or more of said stabilizing agents may also be incorporated in the extracted ethyl cellulose composition. The amount of stabilizing agent employed in the ethyl cellulose composition may vary from about 0.01 to 5% by weight of the ethyl cellulose in the composition, optimum results being achieved, however, employing from 0.05 to 3% by weight of the desired stabilizing agent in the molding composition.

Various plasticizers may also be employed, alone or in combination, to impart particular properties to the ethyl cellulose composition. The plasticizers are valuable for obtaining the desired flow characteristics, resistance to water, grease or oil, flexibility, hardness or other particular properties desired. Thus, for example, plasticizers, such as dibutyl phthalate, dibutyl stearate, tricresyl phosphate, triphenyl phosphate, butyl "Cellosolve" stearate, etc. may be satisfactorily employed in the preparation of the ethyl cellulose compositions. These plasticizers may be employed in amounts of up to 50% or more by weight of the ethyl cellulose present in the composition. Lubricant plasticizers such as "Fractol A," a refined mineral oil, may also be employed in amounts of up to 30% or more on the weight of the ethyl cellulose.

The ethyl cellulose employed in connection with our novel process may have an ethoxyl value of 44 to 49.5%.

In order further to illustrate our invention, but without being limited thereto, the following examples are given:

*Example I*

10 parts by weight of ground ethyl cellulose in flake form, passing through 40 mesh, and of an ethoxyl value of about 45% are extracted with 100 parts by weight of a 50% aqueous solution of ethyl alcohol (2B formula) at 60° C. for 30 minutes, the extraction being repeated three times. 1.5 parts by weight of dibutyl phthalate are then added to the extracted ethyl cellulose flakes and the resulting composition molded under a pressure of 500 pounds per square inch into discs 0.180 inch thick at 200° C. for 15 minutes. The molded discs of extracted dried ethyl cellulose which are obtained exhibit a yellowness coefficient of only .32 while discs molded under like conditions of unextracted ethyl cellulose have a yellowness coefficient of .63. The viscosity loss of the extracted ethyl cellulose is only 25% after molding while that of unextracted cellulose is 43%.

The numerical expression of color development, i. e. the yellowness coefficient, is obtained by determining the light transmission of the sample in question at 640 m$\mu$ minus that at 440 m$\mu$ divided by the light transmission at 640 m$\mu$. The greater this coefficient the greater the degree of color.

*Example II*

100 parts by weight of flake ethyl cellulose of an ethoxyl value of about 45% are extracted four times with 1000 parts by weight of a 50% aqueous solution of ethyl alcohol (2B formula) at 60° C., each extraction being of 30 minutes duration. The extracted ethyl cellulose is then dried. An aqueous solution containing 0.1 part by weight of citric acid is dispersed on to the extracted ethyl cellulose flake and the latter dried. After the citric acid has been placed on the ethyl cellulose, 15 parts by weight of dibutyl phthalate are incorporated therein and the resulting composition molded into discs at 200° C. for 15 minutes. The molded discs obtained have a yellowness coefficient of .24 while the yellowness coefficient of those discs molded without extraction and without the addition of citric acid thereto have a yellowness coefficient of .73.

*Example III*

100 parts by weight of flake ethyl cellulose are extracted four times at 25 to 30° C. with 1000 parts by weight of a 60% aqueous solution of ethyl alcohol (2B formula), the duration of each extraction being 30 minutes. 1 part by weight of decyl sulfite and 0.1 part by weight of citric acid are added to the extracted ethyl cellulose together with 15 parts by weight of dibutyl phthalate. The ethyl cellulose composition obtained is then molded into discs at 200° C. for 15 minutes. The extracted ethyl cellulose containing the stabilizing agents yields a molded disc having a yellowness coefficient of .18 while the unextracted, unstabilized ethyl cellulose yields a molded disc having a yellowness coefficient of .73. After 100 hours exposure to ultraviolet light the extracted and stabilized ethyl cellulose disc has a yellowness coefficient of .11 while that of the unstabilized, unextracted ethyl cellulose has a yellowness coefficient of .30, thus indicating the remarkable color stability obtained by extracting the ethyl cellulose and then incorporating color stabilizing agents therein.

*Example IV*

100 parts by weight of flake ethyl cellulose, of an ethoxyl value of 44%, are extracted four times with 1000 parts by weight of a 65% aqueous solution of methyl alcohol at a temperature of 28 to 30° C., each extraction being of 30 minutes duration. The extracted ethyl cellulose is then dried. 15 parts by weight of dibutyl phthalate are added to the dried extracted ethyl cellulose flakes and the resulting composition molded into discs at 200° C. for 15 minutes. The yellowness coefficient of the molded disc obtained is .67 while that of a disc molded of unextracted ethyl cellulose is .83.

*Example V*

100 parts by weight of flake ethyl cellulose, of an ethoxyl value of 49.4%, are extracted four times with 1000 parts by weight of a 40% aqueous solution of isopropyl alcohol at a temperature of 28 to 30° C., each extraction being of 30 minutes duration. The extracted ethyl cellulose is then dried. 15 parts by weight of dibutyl phthalate are added to the dried extracted ethyl cellulose flakes and the resulting composition molded into discs at 200° C. for 15 minutes. The yellowness coefficient of the molded disc obtained is .51 while that of a disc molded of unextracted ethyl cellulose is .57.

It is to be understood that the foregoing detailed description is given merely by way of illustration and that many variations may be made therein without departing from the spirit of our invention.

Having described our invention, what we desire to secure by Letters Patent is:

1. In a process for the production of color stable compositions of matter having a basis of a cellulose ether and substantially resistant to color changes under the action of heat or light, the steps which comprise subjecting a cellulose ether in particle form to extraction with an aqueous solution of a lower aliphatic alcohol and then incorporating a color-stabilizing agent, selected from the group consisting of octyl sulphite, decyl sulphite and triethylcitryl sulphite, with said extracted cellulose ether.

2. In a process for the production of color stable compositions of matter having a basis of ethyl cellulose and substantially resistant to color changes under the action of heat or light, the steps which comprise subjecting ethyl cellulose in particle form to extraction with an aqueous solution of methyl alcohol and then incorporating a color-stabilizing agent, selected from the group consisting of octyl sulphite, decyl sulfite and triethylcitryl sulfite, with said extracted ethyl cellulose.

3. In a process for the production of color stable compositions of matter having a basis of ethyl cellulose and substantially resistant to color changes under the action of heat or light, the steps which comprise subjecting ethyl cellulose in particle form to extraction with an aqueous solution of ethyl alcohol and then incorporating a color-stabilizing agent, selected from the group consisting of octyl sulphite, decyl sulphite and triethylcitryl sulphite, with said extracted ethyl cellulose.

4. In a process for the production of color stable compositions of matter having a basis of ethyl cellulose and substantially resistant to color changes under the action of heat or light, the steps which comprise subjecting ethyl cellulose in particle form to extraction with an aqueous solution of isopropyl alcohol and then incorporating a color-stabilizing agent, selected from the group consisting of octyl sulphite, decyl sulphite and triethylcitryl sulphite, with said extracted ethyl cellulose.

5. In a process for the production of color stable compositions of matter having a basis of ethyl cellulose and substantially resistant to color changes under the action of heat or light, the steps which comprise subjecting ethyl cellulose in particle form to extraction with an aqueous solution of methyl alcohol containing at least 30% by weight of water and then incorporating a color stabilizing agent, selected from the group consisting of octyl sulphite, decyl sulphite and triethylcitryl sulphite, with said extracted ethyl cellulose.

6. In a process for the production of color stable compositions of matter having a basis of ethyl cellulose and substantially resistant to color changes under the action of heat or light, the steps which comprise subjecting ethyl cellulose in particle form to extraction with an aqueous solution of isopropyl alcohol containing at least 50% by weight of water and then incorporating a color-stabilizing agent, selected from the group consisting of octyl sulphite, decyl sulphite and triethylcitryl sulphite, with said extracted ethyl cellulose.

7. In a process for the production of color stable compositions of matter having a basis of ethyl cellulose and substantially resistant to color changes under the action of heat or light, the steps which comprise subjecting ethyl cellulose in particle form to extraction with an aqueous solution of ethyl alcohol containing at least 40% by weight of water and then incorporating a color stabilizing agent consisting of decyl sulfite with said extracted ethyl cellulose.

WALTER D. PAIST.
FRANK BERARDINELLI.

REFERENCES CITED

The following references are of record in the file of this patent:

UNITED STATES PATENTS

| Number | Name | Date |
|---|---|---|
| 2,086,418 | Hunt et al. | July 6, 1937 |
| 2,218,566 | White | Oct. 22, 1940 |

FOREIGN PATENTS

| Number | Country | Date |
|---|---|---|
| 32,165 | Great Britain | Nov. 11, 1939 |